United States Patent [19]

Lindquist

[11] 3,861,249

[45] Jan. 21, 1975

[54] VALVE CORE TOOL WITH SAFETY BLEED

[75] Inventor: John F. Lindquist, Morton, Ill.

[73] Assignee: Caterpillar Tractor Co., Peoria, Ill.

[22] Filed: Aug. 14, 1973

[21] Appl. No.: 388,188

[52] U.S. Cl. .................................................. 81/15.4
[51] Int. Cl. ............................................ B60c 25/18
[58] Field of Search .... 81/15.4, 3 R, 125 R, 15.2 F, 81/15.3 F; 29/221.5, 249

[56] References Cited
UNITED STATES PATENTS

| | | | |
|---|---|---|---|
| 652,232 | 6/1900 | Culp | 81/15.4 |
| 1,076,981 | 10/1913 | Hard | 81/15.4 X |
| 2,417,360 | 3/1947 | Heintzelman | 81/125 |
| 2,679,654 | 1/1954 | Hosking | 81/15.4 X |
| 2,918,076 | 12/1959 | Dockrell | 81/15.4 X |
| 3,718,057 | 2/1973 | Berchtold | 81/15.4 |

*Primary Examiner*—Al Lawrence Smith
*Assistant Examiner*—Roscoe V. Parker
*Attorney, Agent, or Firm*—Phillips, Moore, Weissenberger, Lempio & Strabala

[57] ABSTRACT

A tool for installing and removing tire valve cores having a safety bleed feature for directing pressurized air and entrained particles away from the operator so as to prevent injury is provided.

2 Claims, 2 Drawing Figures

PATENTED JAN 21 1975

3,861,249

VALVE CORE TOOL WITH SAFETY BLEED

BACKGROUND OF THE INVENTION

This invention is directed to a tool for installing and removing tire valve cores. More particularly, this invention is directed to such an operator manipulated tool which has provision for directing pressurized air and entrained particles away from the operator.

U.S. Pat. No. 3,606,921 issued to Grawey (assigned to the assignee of this application) discloses a novel, oval pneumatic tube-tire. Such patent reveals that the tire is constructed on a core that is dissolved, or otherwise fragmented, and removed prior to use of the tire. Such a process gives rise to the possibility that some residual core particles may remain in the air chamber of the tube-tire when it is inflated for use. This is in no way detrimental to operation of the tire, but may present a hazard to an operator or other service personnel when deflation of the tire is required.

Currently, tire valve core removal tools are extant which have no provision for protecting the operator from air entrained sand and dirt particles.

SUMMARY OF THIS INVENTION

It is an object of this invention to provide an improved tool for installing and removing tire valve cores.

It is a further object of this invention to provide such a tool for bleeding air from such a valve in a safe manner.

It is a further object of this invention to provide a valve core removing tool for safely directing air and entrained particles such as dirt and sand away from the operator.

It is a further object of this invention to provide such a tool for safely directing residual sand core particles from within the tire away from the operator.

It is a still further object to provide such a tool which is both simple and economic to manufacture as well as to use.

The invention takes the form of a cup-shaped body fixed on a shaft with a slot and coaxial bore thereon for engaging a valve core for removal as well as to bleed air or other gaseous fluid through the valve. Ports are provided in the cup-shaped member for laterally directing air and entrained particles such as dirt safely away from an operator.

DETAILED DESCRIPTION

Figure 1:
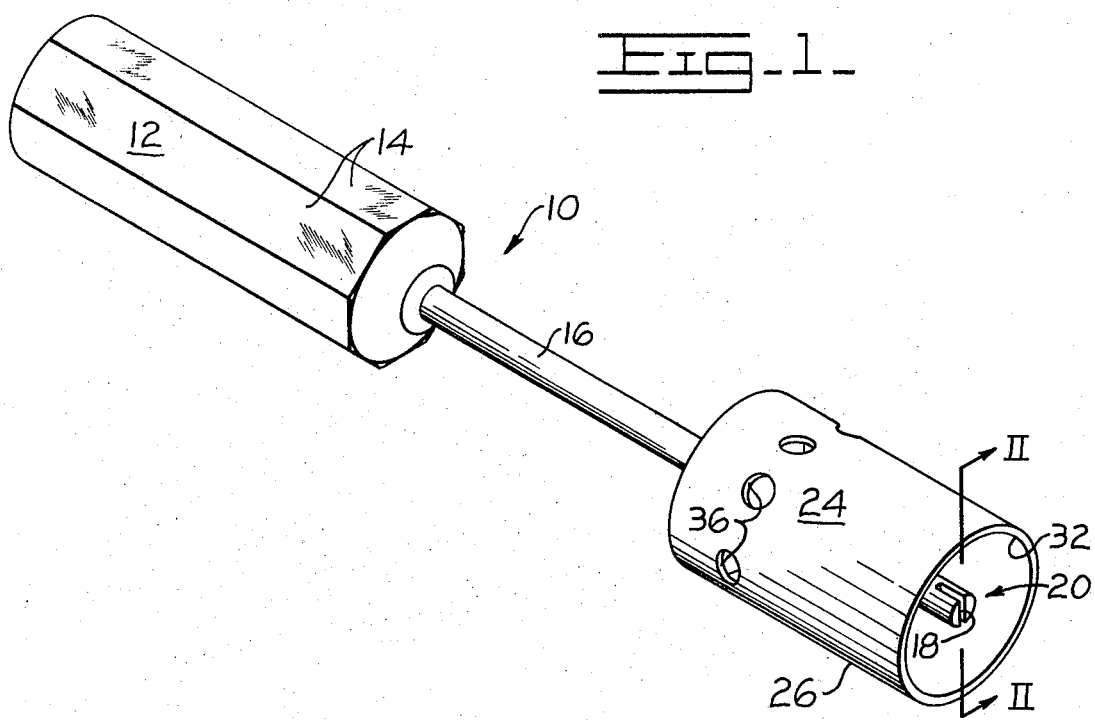
FIG. 1 is an overall top quarter isometric view of the valve core removal tool of the instant invention.
Figure 2:
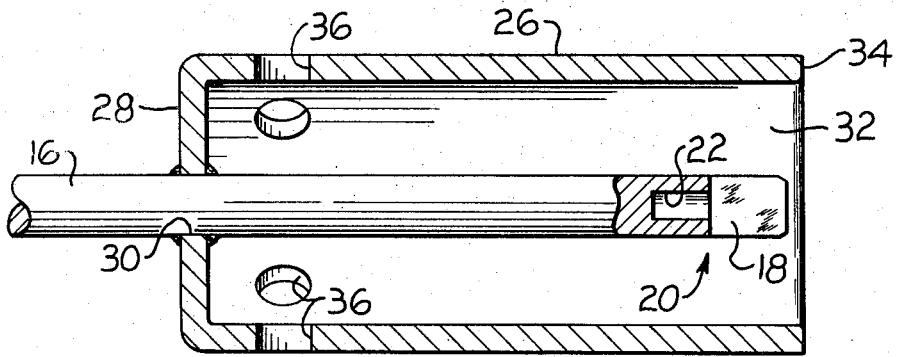
FIG. 2 is an enlarged, partial cross sectional view of the same taken in the direction II—II of FIG. 1.

Referring to the figures, there is shown generally at 10 a valve core removal tool having a manually manipulable handle or grip 12. The handle has a plurality of planar faces 14 therearound in order to facilitate gripping.

A shaft 16 projects from the end of the grip and is affixed thereto so that the shaft is turnable by the grip. A slot 18 is provided at the bit or free end 20 of the shaft. An axial bore 22 is provided in the bit end coaxial with the shaft axis and opening into the base or innermost part of slot 18.

A cup-shaped body 24 comprising a cylindrical wall portion 26 and a closed end wall portion 28 and a centrally disposed opening 30 therethrough is fitted over the bit end of the shaft and suitably affixed thereto such as by welding or brazing. The body is positioned on the shaft so that its open end 32 is radially adjacent and slightly over extends the bit end of the shaft.

The shaft 16 is of a diameter which may be fitted within a tire valve stem (not shown) in order that slot 18 may be fitted over the valve core with bore 22 serving to guide the end of the valve core in the conventional manner.

With the tool in the operative position and the bit end within the valve stem, cup-shaped body 24 is of sufficiently large diameter as to surround but not contact the valve stem. Nevertheless, the annular rim 34 of the cup-shaped body may be rounded so as to preclude any sharp surfaces which might otherwise injure the stem during removal or installation.

As the valve core is removed by manually turning handle 12 and thereby unscrewing the core from the stem, any dirt particles lodged in the stem or residual core sand particles from within the tire air chamber (not shown) are blown out by escaping high pressure air and are caught within the body 24 and radially directed away from the operator through a plurality of ports 36 equally spaced around the cylinder periphery adjacent the closed end thereof. Thus, high velocity particles entrained by the escaping air are prevented from striking the operator, especially in the hands or eyes.

It is to be understood that the foregoing description is merely illustrative of a preferred embodiment of the invention and that the scope of the invention is not to be limited thereto, but is to be determined by the scope of the appended claims.

What is claimed is:

1. A valve core tool comprising an elongated shaft, a handle on one end of said shaft in the form of a generally elongated member defining a plurality of planar surfaces for the purpose of gripping, a slot for receiving a valve core in the other end of said shaft, an axial bore for receiving a valve core stem in said other end of said shaft and opening into said slot, a cup member on said shaft defining a hollow body having an open and a closed end, the interior of said body adjacent its open end being free of surface discontinuities, said cup member being fixed on said shaft such that said other end of said shaft is entirely within said cup member and adjacent to and spaced from its open end, and equally spaced ports in said hollow body adjacent said closed end for radially directing high pressure air from the interior of said body.

2. The invention of claim 1 wherein said open end of said body defines a rounded lip portion.

* * * * *